March 1, 1938.        B. A. AXELRAD        2,109,611
PROCESS OF CONDITIONING, AND RE-USE OF MINE BLEED WATER IN MINING SULPHUR
Filed Sept. 29, 1936
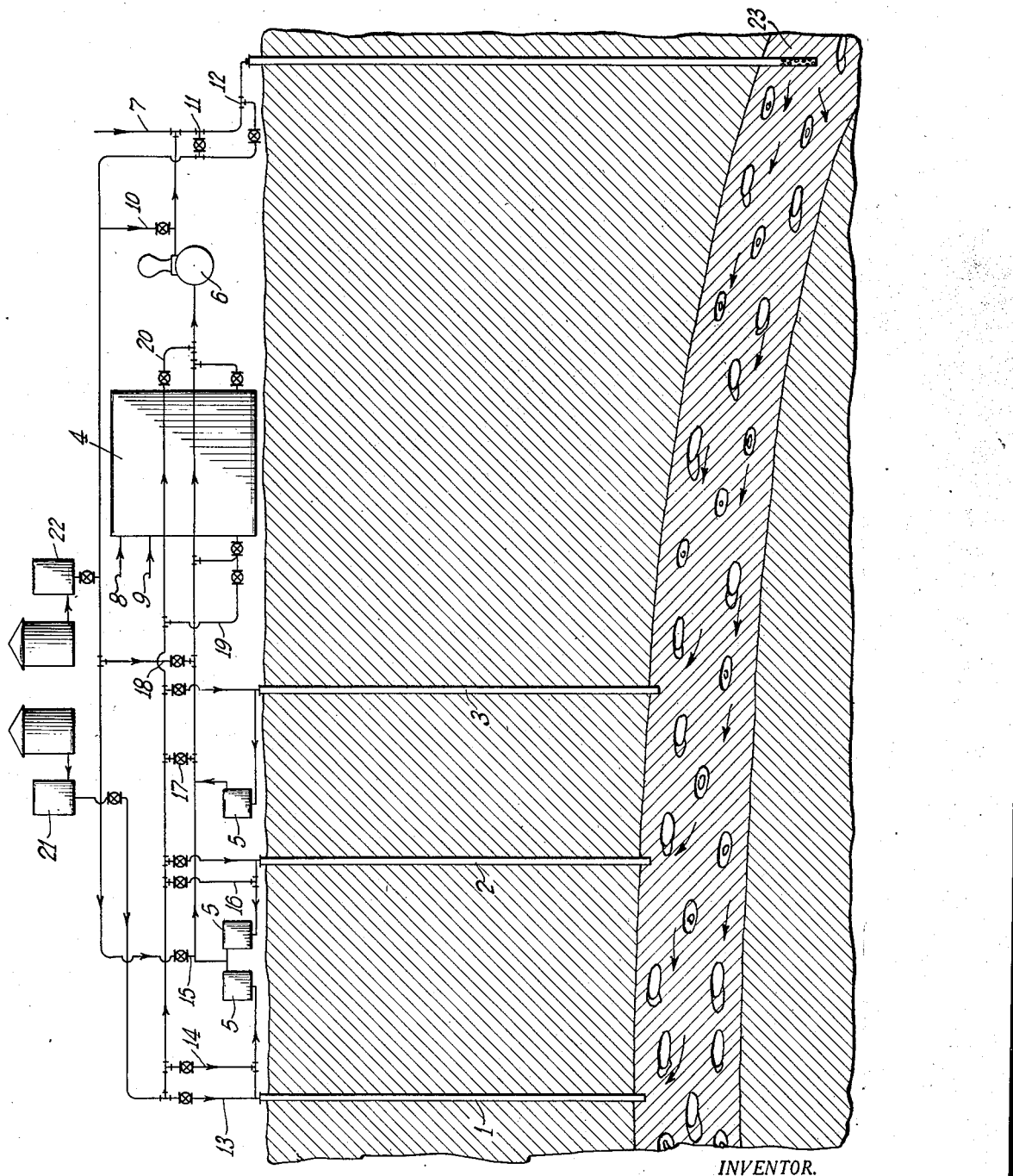
INVENTOR.
Bernard A. Axelrad
BY Watson, Bristol, Johnson & Leavenworth
ATTORNEYS.

Patented Mar. 1, 1938

2,109,611

UNITED STATES PATENT OFFICE 2,109,611

PROCESS OF CONDITIONING, AND RE-USE OF MINE BLEED WATER IN MINING SULPHUR

Bernard A. Axelrad, Freeport, Tex., assignor, by mesne assignments, to Freeport Sulphur Company, a corporation of Delaware Application September 29, 1936, Serial No. 103,101

10 Claims. (Cl. 262—3)

This invention relates to the treatment of water, variously described as "bleed water" and "formation water" and which has been used in the mining of sulphur, in such a manner as to reduce its corrosive and otherwise undesirable properties. The general object of the invention is to provide a suitable treating process affording protection of pipes, valves, well casing, pumps and other equipment from the corrosive action of such water so as to enable the re-use of such water and recovery of its heat content and of valuable constituents which are present.

In the process of mining sulphur by the underground fusion method, a hole is drilled into the sulphur formation and the well equipped with a system of concentric pipes within the well casing. Super-heated water is pumped into the well and discharged into the formations through perforations in the outer pipe. The melted sulphur enters one of the inner pipes and is raised to the surface by a suitable means such as an air-lift. The water (hereinafter designated as mine water) required for melting the sulphur is relatively large in volume in proportion to the sulphur removed, and this volume increases as the sulphur in the deposit is reduced by mining. In this manner, the quantity of mine water required becomes so great after a certain time that it is not profitable to extract the remaining sulphur from the formation.

To prevent the accumulation of excessive pressure the greater portion of the mine water pumped into the deposit must be withdrawn by means of bleed wells, during and/or subsequent to the removal of the sulphur. Water, thus returned to the earth's surface (hereinafter designated as bleed water) is still at an elevated temperature, and in addition to the usual constituents of ground waters such as chlorides, sulphates and bicarbonates of sodium, calcium and magnesium, contains hydrogen sulphide, thiosulphates, hydrosulphides and polysulphides, and other sulphur compounds of various basic elements (which will be designated hereinafter simply as sulphides) and various other dissolved substances. The bleed water is acidic having a hydrogen ion concentration greater than that of neutral water, and these constituents in the bleed water render it highly corrosive and extremely destructive to the usual materials encountered in commercial operation of a sulphur mine, making its re-use entirely uneconomical.

It has long been recognized by the sulphur industry that to recover the heat in bleed water by re-use would be very advantageous and some unsuccessful attempts at recovery have been made. The re-use, without treatment, of the bleed water would require all conduits and equipment with which it came in contact to be made of special noncorrosive material, which is costly and economically impractical. Commercial recovery of the heat in bleed water has heretofore been confined solely to a closed type of heat exchanger in which the bleed water flows over conduits carrying colder fresh water, the heat transfer being from the bleed water through the conduit material and into the fresh water. Only a small part of the heat can be commercially recovered in this manner and the heat exchangers must be constructed of costly non-corrosive materials. It has, therefore, been customary to attempt to locate the bleed wells so as to return to the surface as cold a bleed water as possible and to discharge this water to waste. This practice has accounted for great losses by the sulphur mining industry in the past because of the non-recovery of the heat and other valuable constituents from the bleed water by the inability to re-use the bleed water and by loss of heat due to the flow of the hot mine water to the upper formations of the deposit where it is no longer available for melting sulphur in situ. The disposal of the bleed water thus produced is subject to the further disadvantage in that the suspended matter, hydrogen sulphide, and sulphides contaminates surface water into which the bleed water may be permitted to flow. In order to prevent objecttionable pollution, it is necessary to purify the bleed water before its discharge, and such purification is now required for the protection of marine life by governmental agencies. The apparatus and process of purification before disposal have imposed a heavy expense upon the sulphur mining industry.

One of the objects of this invention is to effectively and economically reduce the corrosiveness of the bleed water by repressing the formation of hydrogen sulphide toward the formation of hydrosulphides and still further to alkaline sulphides and to lower the hydrogen ion concentration thereby diminishing the corrosive action of the bleed water.

Another object of this invention is to deposit upon the surface of pipes, valves, pumps, and all auxiliary equipment which may come in contact with any water used in sulphur mining, a coating of scale which will protect the equipment from corrosion.

A further object of this invention is the control of such scale deposition by varying the composition and hydrogen ion concentration of the water so that such scale is smooth, hard, adherent, and impervious.

A still further object of this invention is the control of such deposition, either by intermittent deposition and solution, or by intermittent deposition and maintaining certain chemical equilibria in the water so as to neither deposit nor dissolve scale, so that the scale will be an optimum thickness or sufficient to afford the proper protection while causing minimum obstruction to flow of water and operation of the equipment.

Another object of this invention is to recover the heat content in the bleed water and to reclaim the bleed water for further use either as mine water (with the addition of make-up heat in the form of hot water) and/or as steam, as may be desired.

A still further object is to make possible the recovery of the suspended and dissolved sulphur and/or various other valuable constituents in the bleed water if desired.

In the attached drawing is shown diagrammatically a sulphur mine system incorporating a suitable apparatus for carrying out the improved process. An example of the manner in which the present process may be carried out is as follows:

Bleed water is conducted from bleed wells 1, 2 and 3 through suitable gathering lines to a suitable receiving chamber 4 where suspended matter and dissolved gases may be separated. The pressure in the formations may be sufficiently high to conduct the bleed water to the receiving chamber. In some cases it may be desirable to increase the flow from a bleed well and/or to deliver the bleed water to the receiving tank at a higher pressure and this accomplished by either installing a deep well pump at some convenient depth in the well or by installing the surface pump 5 or any other suitable device for injecting the bleed water into the gathering line between the bleed well and receiving tank. Pumps or similar devices 6 take the bleed water from the receiving chamber and inject it into conduits 7 carrying the mine water for distribution into the formation 23. The temperature of this mine water can be varied through a wide range and suitable meters, valves and other regulating devices are provided to obtain the necessary control of temperature and volume so that the mixture of mine water and bleed water can be regulated to the temperature and volume desired for sulphur mining purposes. Blow down 8 (concentrated hot water) from the boilers and/or steam 9 may be added, if desirable, to the bleed water at any point preceding its mixing with the mine water or the mixing of the bleed water and mine water may take place in a suitable heater to which steam and/or blow down is added.

My new process for the protection of pipes, valves, pumps, and auxiliary equipment from the corrosive action of water used in sulphur mining comprises varying the composition and hydrogen ion concentration of such waters, as required by the solubility equilibria of certain salts which are present, in such a manner that a protective layer of certain salts is deposited on the surface of the equipment.

The broad idea of protection of metal from corrosion by the deposition of layers is not a new art as it is well known that cold water mains may be protected by changing the composition with respect to the solubility equilibrium of calcium carbonate so that a scale of this salt is deposited. Such control has been accompanied by the maintenance of equilibrium conditions in the water entering a distribution system, and has resulted in the deposition of a protection layer even at distant points. This treatment for cold water mains is not satisfactory for pipes and equipment in contact with water used in sulphur mining. Such continuous treatment when applied to water of the composition and temperature incident to the mining of sulphur as contemplated in this invention is accompanied by reactions of greater velocity, variety and complexity than those involved in the protection of cold water mains. Treatment at one point, therefore, causes the deposition of a protection layer for a limited distance from the point of application and beyond this point the metal is left exposed to the corrosive action of the water. It is difficult to lengthen the distance from the point of application that is protected by the deposition of the protective layer as any change in treatment of the water will either result in no deposition or change the character of the protective layer from a hard, adherent scale to a soft, non-adherent scale or sludge formation which affords little or no protection from corrosion. The process necessary for the protection of pipe lines, etc., in the sulphur mining industry differs further from the process applicable to cold water mains, particularly in that the composition, temperature, pressure, and velocity of the water used in sulphur mining varies at different points in the system, and separate and specific treatment at the several points are required to deposit and maintain a satisfactory protection scale. Thus, the mine water (consisting in this process of a mixture of salvaged bleed water and make-up mine water at a high temperature) requires a certain application of alkaline salts at various places 11 and 12 to deposit a protection layer; the number of points of application being sufficient to make the protective scale a continuous coating of the proper thickness. Treatment of the mine water is then maintained at a point of equilibrium at which scale is neither dissolved nor deposited and this treatment varies with whatever treatment is being used at the time on the bleed water that makes up a part of the mine water. It may be preferable to control the treatment of the mine water so that a slow solution of the scale takes place and in this case intermittent deposition of scale is provided. The bleed water, containing hydrogen sulphide, sulphides, and other materials, requires a specific treatment as at 13 upon its entrance into the well pipe which delivers it to the surface of the earth, and additional treatment at various points as 10, 14, 15, 16, 17, 18, 19 and 20 prior to its injection into the mine water. In this manner my process for the protection of metal equipment in contact with water used in sulphur mining consists of a multiple and varied application of alkaline chemicals 21 and 22 such as lime, soda ash, phosphates, and/or silicates, etc., to change the composition of the water in each part of the system. The process may be controlled by periodic inspection of parts of the system which are arranged to facilitate such inspections; or it may be controlled by constant observation of the composition of the water in certain parts of the system or by a combination of these two methods. The application of chemicals to the water is so controlled that at certain times and in certain parts of the system scale is deposited; at other times and/or at other points, scale may be dissolved; while at still other times and/or at other points, an equilibrium between solution and deposition of scale may be maintained. In this manner, the system is separated into segments that can readily be controlled, and in each segment, the optimum deposit of scale is maintained in order to protect the equipment from corrosion without interfering with its functioning.

What I claim is new and desire to secure by Letters Patent is:

1. A process for re-using water which has been used in sulphur mining comprising collecting and heating bleed water, then individually determining the condition of the protection at a plurality of points in the water distributing system, adding an alkaline chemical to the water at such points in the system and in such amounts as to deposit and maintain a layer of various salts on the metal surface in contact with the water supplied and subsequently adding the water treated to that which is used for mining operations or for other purposes.

2. A process for re-using water which has been used in sulphur mining comprising collecting and heating bleed water, then individually determining the condition of the protection at a plurality of points in the water distributing system, adding an alkaline chemical to the water at such points in the system and in such amounts as to reduce the corrosiveness of the water and to deposit and maintain a layer of various salts on the metal surface in contact with the water supplied, and subsequently adding the water treated to that which is used for mining operations or for other purposes.

3. A process for re-using water which has been used in sulphur mining comprising collecting and heating bleed water, then individually determining the condition of the protective coating in the pipes of the water distributing system at a plurality of points, adding alkaline chemical to the water at such points in the system and in such amounts as to reduce the corrosiveness of the water and to deposit and maintain a layer of various salts on the metal surfaces in contact with the water and to raise the temperature of the used water, by the addition of heat previous, during and/or subsequent to the chemical treatment, to that desired for sulphur mining purposes.

4. A process for re-using water which has been used in sulphur mining comprising collecting and heating bleed water, then individually determining the condition of the protective coating in the pipes of the water distributing system at a plurality of points, adding an alkaline chemical to the water at such points in the system and in such amounts as to reduce the corrosiveness of the water and to deposit and maintain a layer of various salts on the metal surfaces in contact with the water and to raise the temperature of the bleed water by the addition of heat previous, during and/or subsequent to the chemical treatment, and subsequently adding the water treated to that which is used for mining operations or for other purposes.

5. A process of treating mine water led from an underground mining formation, which comprises collecting the mine water led from a plurality of wells in a mining area and conveying the same through pipes to a common receiving chamber, returning water through other pipes to the formation, determining the solubility equilibria at a plurality of points in such proximity as to afford an approximately uniform deposit thereon, and introducing at each of said points a quantity of chemical individually determined to be such as to produce a uniform coating over the interior surface of the pipe approximately adjacent such point.

6. A process of treating bleed water for re-use in sulphur mining by underground fusion, which comprises collecting the bleed water from a plurality of bleed wells in a mining area and leading the same through metal pipes to a common receiving chamber, returning the water through other pipes to the formation, determining the condition of the coating formed in said pipes, after a period of operation, at a plurality of points in such proximity as to afford a substantially uniform protective deposit thereon, and introducing at each of said points a solution containing a chemical in amount individually determined to be such as to maintain a uniform protective coating over the metal area approximately adjacent such point.

7. A process of treating bleed water for re-use in sulphur mining by underground fusion, which comprises collecting the bleed water from a plurality of bleed wells in a mining area, and leading the same through metal pipes to a common receiving chamber, admixing a desired amount of fresh water with said collected bleed water, returning the resultant mine water through other pipes to the formation, determining the solubility equilibria at a plurality of points in such proximity as to afford a substantially uniform protective deposit thereon and introducing at each of said points a quantity of chemical individually determined to be such as to produce a uniform protective coating over the metal area approximately adjacent such point.

8. A process of treating bleed water for re-use in sulphur mining by underground fusion, which comprises collecting the bleed water from a plurality of bleed wells in a mining area and leading the same through metal pipes to a common receiving chamber, admixing a desired amount of fresh water with said collected bleed water, returning the resultant mine water through other pipes for the formation, determining the instant condition of the coating formed in said pipes at a plurality of points which are in such proximity as to afford substantial equilibrium between the coating and the salt concentrations in the fluid passing, and thereupon introducing at each of said points a solution of chemicals in an amount individually determined to be such as will maintain the layer of salts deposited on the metal approximately adjacent said point in relatively uniform condition.

9. A process of treating bleed water for re-use in sulphur mining by underground fusion, which comprises collecting the bleed water from a plurality of bleed wells in a mining area and leading the same through metal pipes to a common receiving chamber, heating the collected bleed water in said receiving chamber, admixing a desired amount of fresh water with said collected bleed water, returning the resultant mine water through other pipes to the formation determining the instant condition of the coating formed in said pipes at a plurality of points which are in such proximity as to afford substantial equilibrium between the coating and the salt concentrations in the fluid passing, and thereupon introducing at each of said points a solution of chemicals in an amount individually determined to be such as will maintain the layer of salts deposited on the metal approximately adjacent said point in relatively uniform condition.

10. A process of treating bleed water for re-use in sulphur mining by underground fusion, which comprises collecting the bleed water from a plurality of bleed wells in a mining area and leading the same through metal pipes to a common receiving chamber, admixing a desired amount of fresh water with said collected bleed water, returning the resultant mine water through other pipes to the formation, determining the instant condition of the coating formed in said pipes at a plurality of points which are in such proximity as to afford substantial equilibrium between the coating and the salt concentrations in the fluid passing, and thereupon introducing at each of said points a solution of one or more chemicals chosen from the group consisting of lime, soda ash, caustic soda, soluble phosphates and soluble silicates, the concentration and amount of said solution being so determined for the point where introduced that solubility equilibrium results whereby corrosiveness is off-set and the layer of salts deposited on the metal in proximity to the point is maintained in substantially uniform condition.

BERNARD A. AXELRAD.